United States Patent
Cole

[11] 3,740,115
[45] June 19, 1973

[54] FIBERSCOPE VIEWING SYSTEM WITH DYNAMIC IMAGE ENHANCER

[75] Inventor: Henry B. Cole, Woodstock, Conn.

[73] Assignee: American Optical Corporation, Southbridge, Mass.

[22] Filed: Sept. 2, 1971

[21] Appl. No.: 177,229

[52] U.S. Cl. ................................. 350/96 B, 350/6
[51] Int. Cl. ............................................. G02b 5/16
[58] Field of Search .................................. 350/96 B

[56] References Cited
UNITED STATES PATENTS

| | | | |
|---|---|---|---|
| 3,110,762 | 11/1963 | Frank | 350/96 B X |
| 3,194,142 | 7/1965 | Black | 350/96 B X |
| 3,187,627 | 6/1965 | Kapany | 350/96 B X |

*Primary Examiner*—John K. Corbin
*Attorney*—William C. Nealon, Jeremiah J. Duggan, Robert J. Bird, Bernard L. Sweeney and Joel Wall

[57] ABSTRACT

A flexible optical fiber viewing system including a relatively long and thin bundle of optical fibers having image-receiving and image-emitting opposite end faces and a bundle of tapered optical fibers having image-receiving and image-emitting opposite end faces. The image-emitting and image-receiving faces of the bundle of tapered fibers and the flexible fiber bundle respectively are optically interfacially coupled and one is rotated eccentrically relative to the other to effect nutation of images conveyed by the bundle of tapered fibers upon the image-receiving face of the flexible bundle of optical fibers. Rotated synchronously with the bundle of tapered optical fibers, adjacent the image-emitting face of the flexible bundle, is a tilted plate of glass or its equivalent which receives the optical images emitted by the flexible bundle for neutralizing motion imparted to these images at the image-receiving end of the bundle.

4 Claims, 3 Drawing Figures

PATENTED JUN 19 1973 3,740,115

FIBERSCOPE VIEWING SYSTEM WITH DYNAMIC IMAGE ENHANCER

BACKGROUND OF THE INVENTION

1. Field of the Invention

Optical fiber image-transmitting devices and systems with particular reference to apparatus for producing dynamic image enhancement in such devices and systems.

2. Description of the Prior Art

Dynamic enhancement of images relayed in a fiber optical system is, in general, achieved by scanning an input image over the receiving face of a fiber optical image transmitter and then stabilizing the output image so that it appears stationary to the eye of the observer. Heretofor, as in U.S. Pat. No. 3,016,785 for example, this technique of enhancing images has required the use of excessively complicated and costly apparatus wherewith in most, if not all, instances the optical fiber-conveying light pipes or fiberscopes were either themselves vibrated or otherwise moved relative to a stationary image requiring transmission or, in cases where means have been provided for producing image motion relative to such optical fiber conveying devices, there has been the necessity for restricting image-receiving and image-emitting opposite ends of the fiberscope from freedom of individual movement or displacement relative to each other. In all cases, the distinct advantages of dynamic image enhancement have been largely outweighed by undue complication, expense and ungainliness of equipment, even with which optimum performance in image enhancement has not been entirely satisfactory.

This invention provides for dynamic image enhancement in a flexible fiber optical device hereinafter referred to as a "fiberscope viewing system" with the new and unusual results of dependable operation and simplified apparatus allowing complete freedom of relative movement between the object (distal) and viewing (proximal) opposite ends of the system.

SUMMARY OF THE INVENTION

Apparatus of this invention comprises a bundle of tapered optical fibers which will be referred to hereinafter as a "tapered fiber bundle" having image-receiving and image-emitting opposite end faces. The tapered fiber bundle is positioned with its image-emitting face optically coupled to the image-receiving face of a flexible optical fiber bundle hereinafter referred to as the "fiberscope." A suitable clear mineral or petroleum oil, or its equivalent is placed between faces of the coupling to minimize reflection losses. With the coupling oil also serving as a lubricant, the tapered fiber bundle is rotated eccentrically, or about an axis eccentric to the fiberscope wherewith images directed upon and conducted through the tapered fiber bundle are nutated over the image-receiving face of the fiberscope. With simple gearing and shafting or self-synchronous motor drives, a second identical tapered fiber bundle or its equivalent (e.g. a tilted plate of glass, optical wedge or prism) is rotated synchronously with the first-mentioned tapered fiber bundle so as to compensate for and neutralize or stabilize the induced motion of image as it is emitted from the second tapered fiber bundle. Thus, dynamic image enhancement with all of its well known advantages is accomplished economically and with exceptional simplicity.

Details of the present invention will become more readily apparent from the following description when taken in conjunction with the accompanying drawings.

IN THE DRAWINGS

DESCRIPTION OF THE PREFERRED EMBODIMENTS

Figure 1:
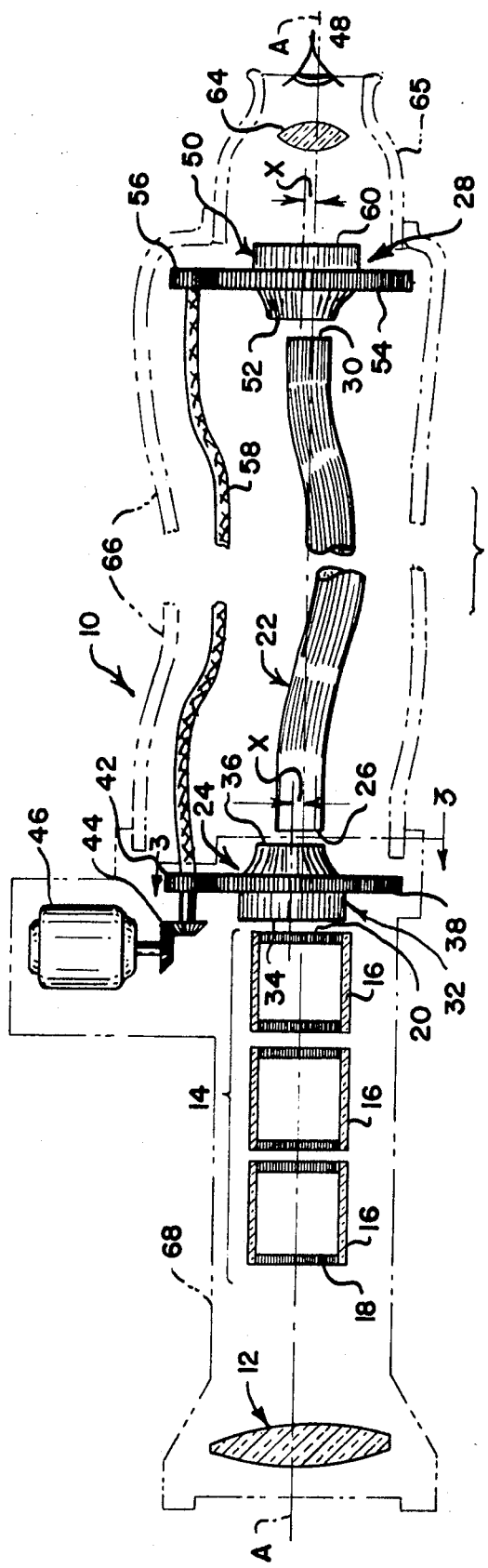
FIG. 1 is a partially cross-sectioned generally schematic illustration of an embodiment of the invention.

Referring more particularly to FIG. 1, the combination of apparatus making up fiberscope viewing system 10 includes, at the distal end of the system, an optical objective 12 and an image intensifier 14. The image intensifier 14 comprises at least one but preferably three or more cascaded image intensifying tubes 16 generally of the type shown and described in U.S. Pat. No. 3,141,105, for example.

Objective 12 is schematically illustrated as comprising only a single lens with the intension of its being representative of any suitable conventional optical objective so constructed and arranged as to produce images of objects under observation by system 10 upon the image-receiving face 18 of image intensifier 14. The image thus received by intensifier 14 is amplified in its intensity and emitted at face 20 of the intensifier. Thus, images of objects in low illumination, e.g. starlight, may be observed on emitting face 20 as comparing favorably in definition and luminous intensity with images capable of being produced by objective 12 alone, under normal daylight conditions.

In dealing more particularly with matters of relaying optical images over considerable distances, e.g. several feet, the system 10 utilizes fiberscope 22 of considerable length having dynamic image-enhancing, motion-imparting means 24 adjacent its image-receiving end 26 and image-motion stabilizing or neutralizing means 28 adjacent its image-emitting end 30.

It is pointed out that all mention herein of optical fibers and devices such as fiberscopes and fiber optic plates which are formed of optical fibers is intended to include and/or involve the use of conventional optical fibers, typical constructional details of which and their application to fiberscopes and plates may be found in one or more of U.S. Pat. Nos. 3,992,516; 3,033,731; and 2,992,587, for example.

Referring more particularly to the image motion imparting means 24 of FIG. 1, this includes bundle 32 which comprises a great number of individually tapered light-conducting fibers all fused, cemented or otherwise connected together as a group with the larger ends of each forming image-receiving face 34 of bundle 32 and corresponding smaller ends of the fibers forming image-emitting face 36 of bundle 32. The bundle 32 will be referred to hereinafter as "tapered bundle 32."

Figure 2:
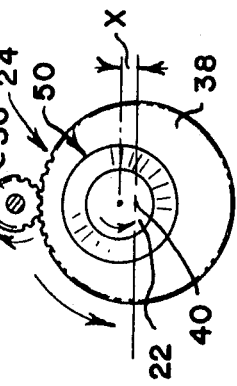
FIG. 2 illustrates a modification of the fiberscope viewing system shown in FIG. 1.
Figure 3:
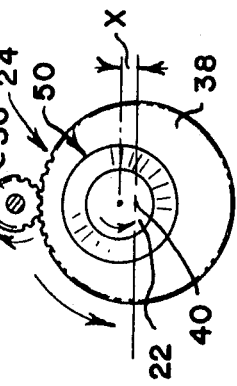
FIG. 3 is a cross-sectional view taken generally along line 3—3 of FIG. 1.

Tapered bundle 32 is optically interfacially coupled between image-emitting face 20 of intensifier 14 and image-receiving end 26 of fiberscope 22 for the purpose of introducing motion to images directed into fiberscope 22 when bundle 32 is rotated eccentrically relative to end 26 of the fiberscope. A suitable transparent mineral or petroleum immersion oil is applied to the respectively coupled faces of the intensifier 14-tapered bundle 32-fiberscope 22 combination. This reduces loss of light by reflection at the interface and, at the same time, provides lubrication for the moving bundle 32. The aforesaid eccentric rotation of bundle 32 may be effected by rotating it on an axis eccentric to the symmetry axis of the bundle or nutating (swinging in a circle) the bundle 32 over end 26 of fiberscope 22. For purposes of illustration, the former is depicted in FIGS. 1 and 2. Bundle 32 is decentered in ring gear 38 a distance x from the center 40 of gear 38 about which the gear is rotated. Bundle 32 is fixedly secured, e.g. with an epoxy resin or suitable cement, within the gear 38 with its axis disposed parallel to the axis of gear 38. Through appropriate gearing 42 and 44, ring gear 38 is rotated by operation of motor 46. This causes tapered bundle 32 to rotate relative to end 26 of fiberscope 22 about an axis eccentric to the symmetry axis of its taper (e.g. about center 40 of ring gear 38). Thus, images emitted from face 36 of tapered bundle 32 are caused to nutate over image-receiving end 26 of bundle 22. Exemplary speeds of nutation may range from 500 to 2,000 cycles per minute and the extent of image motion eccentrically (e.g. distance x) may range from approximately one-tenth to one-half milimeter.

This nutation or motion of images as they are received by fiberscope 22 is carried through the fiberscope during the transmission of images from end 26 to end 30 thereof. At end 30 of fiberscope 22, motion neutralizing means 28 compensates for the induced motion in such manner as to stablize or render these images, as viewed by an eye 48 of an observer, stationary but enhanced in definition.

The motion neutralizing means 28, in the embodiment of the invention illustrated in FIG. 1, comprises a second tapered bundle 50 which is, as near as possible, identical to tapered bundle 32. In the case of bundle 50, however, its end of smallest size is used as its image-receiving face 52. This face 52 is optically coupled to image-emitting end 30 of fiber bundle 22, i.e. preferably with a suitable clear immersion oil. Tapered bundle 50 is cemented or otherwise fixedly secured eccentrically within ring gear 54. The direction of eccentricity or offset of bundle 50 in ring gear 54 relative to center of rotation is identical to the direction of offset of tapered bundle 32 in ring gear 38. Ring gears 38 and 54 are both centered on axis A—A of system 10. Gear 54 is rotated synchronously with ring gear 38 by means of flexible shaft 58 and gear 56. Instead of flexible shafting 58, conventional self-synchronous motor drives, e.g. a selsen system or its equivalent (not shown) may be employed.

Dynamic enhancement of images produced by system 10 results from the discovered phenomenon of optical images being caused to move laterally in response to lateral movement of tapered optical fibers as opposed to no lateral movement of images taking place in response to lateral movement of bundles of straight (i.e. non-tapered) image-conducting fibers and fiber bundles. Thus, the rotation of tapered bundle 32 on an axis eccentric to its symmetry axis causes nutation of images emitted from bundle 32 upon end 26 of fiberscope 22.

This motion of the images for dynamic enhancement thereof, is carried through fiberscope 22.

Adjacent the emitting end of fiberscope 22, this motion of images is compensated for or neutralized by precisely duplicating the direction, extent and rate of nutation of the images with the other tapered fiber bundle 50. Thus, images emitted from face 60 of bundle 50 are stablized for viewing. Such dynamically enhanced images, having greater than usual resolution, result from dynamically eliminating spot and line effects which would ordinarily occur as images of boundary lines between individual fibers and/or multifibers, broken or poorly conducting fibers or groups of fibers extraneous particulate matter and/or excessive amounts of connecting cements or matrix materials used in the fabrication of the devices.

FIG. 2 illustrates a modification of image motion stabilizing means which is adaptable to the system 10 of this invention. In this case, a flat solid glass plate 62 may be substituted for tapered bundle 50 in ring gear 54. Plate 62 would preferably be centered in ring gear 54, rather than placed eccentrically therein, and tilted relative to axis A—A of system 10 by angle $\theta$ having the same vertical direction as the direction of offset x of tapered bundle 32 relative to fiberscope 22. Angle $\theta$ would be of such degree that refraction of image-forming light by plate 22 would direct all image forming light in a direction radially toward axis A—A by the amount x thus neutralizing all motion of images emitted from end 30.

Eye piece 64 within housing 60 assists in the viewing of the stabilized and dynamically enhanced images produced by system 10. Completing the fiberscope system 10 is flexible housing or sheathing 66 enclosing fiberscope 22 and housing 68 enclosing the remaining distal end portion of the system, housing 65, 66 and 68 are all shown schematically for ease and convenience of illustration.

I claim:

1. In a fiberscope viewing system including means for forming optical images of remote objects within the system, an elongated image-transmitting fiberscope having image-receiving and image-emitting opposite end faces and eye piece means in the system for viewing images transmitted by and emitted from said fiberscope, the improvement, in combination with said fiberscope, comprising:

a bundle of tapered optical fibers all secured together in side-by-side relationship with each other, corresponding larger ends of said fibers forming an image-receiving face of said bundle and corresponding opposite smaller ends of said fibers together forming an image-emitting face of said bundle, said image-emitting face of said bundle of tapered optical fibers and said image-receiving face of said fiberscope being optically interfacially coupled;

means for continuously moving said bundle of tapered optical fibers in given directions and amounts relative to said image-transmitting fiberscope for imparting a nutuational movement of images emitted from said bundle into said fiberscope; and means for continuously neutralizing said movement of images adjacent said image-emitting end of said fiberscope in directions and by amounts corresponding to said direction and amount of said moving of said bundle to stabilize said images for static viewing thereof in said eyepiece of said system.

2. The improvement in a fiberscope viewing system according to claim 1 wherein said means for neutralizing said movement of said images comprises a second bundle of tapered optical fibers being substantially constructionally identical to said first-mentioned bundle, said second bundle being disposed with its end of smallest dimension interfacially rotatably coupled to said image-emitting face of said fiberscope; and means for moving said second bundle of tapered optical fibers synchronously in the same direction and extent as the movement of said first mentioned bundle.

3. The improvement in a fiberscope viewing system according to claim 2 wherein said first and second bundles of tapered optical fibers have their respective axes of symmetry offset from centers of respectively adjacently optically coupled image-receiving and image-emitting end faces of said fiberscope;

the extent and radial directions of said offset being substantially identical in each case; and said means for moving said first and second bundles of tapered fibers is constructed and arranged to revolve said bundles of tapered fibers about centers of respectively adjacent end faces of said fiberscope.

4. The improvement in a fiberscope viewing system according to claim 1 wherein said means for neutralizing said movement of said images comprises:

a flat plate of glass adjacent said image-emitting face of said fiberscope, said plate of glass being tilted relative to said image-emitting face of said fiberscope sufficiently for effecting said neutralization of movement of images when rotated synchronously with said movement of said bundle of tapered optical fibers and means for rotating said plate of glass synchronously with said movement of said bundle of tapered fibers.

* * * * *